United States Patent [19]
Lau

[11] Patent Number: 5,979,070
[45] Date of Patent: Nov. 9, 1999

[54] METHOD AND APPARATUS FOR SELECTIVELY LOCKING A MOVEMENT DIRECTION OF A COORDINATE MEASUREMENT PROBE

[76] Inventor: Kam C. Lau, 7901-C Cessna Ave., Gaithersburg, Md. 20879

[21] Appl. No.: 08/994,542

[22] Filed: Dec. 19, 1997

[51] Int. Cl.[6] .................................................. G01B 5/20
[52] U.S. Cl. ........................... 33/559; 33/DIG. 2; 33/503
[58] Field of Search .......................... 33/1 M, 503, 556, 33/561, 559, DIG. 2

[56] References Cited

U.S. PATENT DOCUMENTS

| | | | |
|---|---|---|---|
| 3,599,339 | 8/1971 | Adamczyk | 33/556 |
| 3,869,799 | 3/1975 | Neuer et al. | 33/503 |
| 3,945,124 | 3/1976 | Jacoby et al. | 33/561 |
| 4,457,621 | 7/1984 | Harris et al. | 359/201 |
| 4,471,529 | 9/1984 | Kohler | 33/559 |
| 4,523,383 | 6/1985 | Rogers et al. | 33/558 |
| 4,553,332 | 11/1985 | Golinelli et al. | 33/561 |
| 4,578,873 | 4/1986 | Klingler et al. | 33/559 |
| 4,716,656 | 1/1988 | Maddock et al. | 33/503 |
| 4,866,854 | 9/1989 | Seltzer | 33/558 |
| 4,937,948 | 7/1990 | Herzog et al. | 33/559 |
| 4,964,223 | 10/1990 | Linder et al. | 33/556 |
| 5,018,278 | 5/1991 | Aehnelt et al. | 33/559 |
| 5,029,399 | 7/1991 | McMurtry | 33/559 |
| 5,212,873 | 5/1993 | McMurtry | 33/559 |
| 5,259,122 | 11/1993 | Ichiba et al. | 33/559 |
| 5,357,684 | 10/1994 | Lindner et al. | 33/DIG. 2 |
| 5,414,940 | 5/1995 | Sturdevant | 33/559 |
| 5,848,477 | 12/1998 | Wiedmann et al. | 33/503 |

FOREIGN PATENT DOCUMENTS

WO 89/05435  6/1989  WIPO.

*Primary Examiner*—G. Bradley Bennett
*Attorney, Agent, or Firm*—Sixbey, Friedman, Leedom & Ferguson, P.C.; Donald R. Studebaker

[57] ABSTRACT

A measurement probe has a plurality of movement directions, and is constructed with one or more pneumatically actuated locking mechanisms, each of which can be selectively actuated to prevent movement along one of the movement directions. The pneumatic actuator has a flexible diaphragm which is expanded by application of air pressure to move a spring member, thus engaging a locking element connected to the spring member with a receiving element to prevent movement of the probe in the direction associated with that locking mechanism. A pneumatic control system is provided to control the locking mechanism(s) in accordance with operator desires, a predetermined program, or operating requirements of an electronically controlled machine associated with the probe.

25 Claims, 7 Drawing Sheets

METHOD AND APPARATUS FOR SELECTIVELY LOCKING A MOVEMENT DIRECTION OF A COORDINATE MEASUREMENT PROBE

FIELD OF THE INVENTION

The present invention relates generally to coordinate measuring probes which are moved in spatial contact with an object, so as to generate variable signals indicating the position of points on the surface of the object relative to the probe along a plurality of axes, thereby precisely defining the spatial position of surface points on the object. The invention particularly relates to a locking mechanism and locking method for preventing movement of such a probe along one or more of its sensing axes.

BACKGROUND OF THE INVENTION

In industry, there often arises a need to precisely measure the spatial location of a point or points on an object. This need may occur, for example, in operation of coordinate measurement machines, machine tools, and robots. Typically, a probe is mounted on the machine for movement in three dimensions, X, Y, and Z. The machine is capable of measuring the X, Y, and Z coordinates of the probe.

Two types of probes are in common use. One is a trigger probe, which produces a trigger signal when a stylus attached to the probe contacts the workpiece surface. This trigger signal is used to latch the output from the scales and read heads of the machine, and causes a computing device associated with the machine to read the X, Y, and Z coordinates thus sensed, which indicate the position of the point where the stylus contacted the workpiece.

The other type of probe is a measurement probe. The measurement probe produces an analog or digital output proportional to displacement of a stylus of the probe in the X, Y, and Z directions, rather than merely producing a trigger signal. Such probes are particularly useful for scanning the contour of a workpiece surface, as opposed to measuring specific points on the surface. It is in the measurement-type probe that the present invention finds its primary application.

Typical prior art measurement probes have a pair of spring members located at either end of a member movable along each of the X, Y, and Z axes. For example, see WIPO Publication WO89/05435 of McMurtry et al., and FIG. 2a. The stylus is mounted to the spring members so that movement of the stylus in the X, Y, and Z directions produces corresponding movement in the respective axial members. This movement is measured by precision position sensors associated with each axis. In some cases, these position sensors have stop elements or biasing elements for use in establishing stable rest positions, as illustrated for example in U.S. Pat. Nos. 4,578,873, 4,716,656, and 5,029,399.

FIG. 1 illustrates, with some exaggeration for illustrative purposes, a phenomena found in many conventional measurement probes. Spring members 10 for each axis form a rectangle 20 which is distorted by movement of the stylus 30 along that axis, so that the rectangle becomes a parallelogram 40. Because the dimensions of the spring members 10 are fixed, as the spring distortion increases due to movement along one axis, this parallelogram effect produces a measurable apparent movement "d" along an axis perpendicular to the axis of spring distortion. Thus, in this type of probe, some of the measured movement in each axis is the result of spring deformation within the probe, rather than any actual variation in position of the workpiece along that axis. The amount of error resulting from spring geometry increases with increased displacement of the springs along a given axis.

The 3D Accuprobe 3.0 measurement probe, designed and manufactured by the assignee, Automated Precision, Inc. of Gaithersburg, Md., provided an improved internal geometry enabling significant improvements in measurement accuracy. This probe incorporates an improved V-spring mechanism (FIG. 2b) that reduces distortion effects of the spring geometry.

However, in situations where very precise position measurements are desired, even with improved spring geometries, the springs bias the stylus into an arc-shaped path. Thus, even if the relative motion of the stylus and workpiece occurs only in a single axis, the spring geometry creates a movement measurement in an axis perpendicular to that axis, generating a measurement error along the perpendicular axis. If it is known that movement along an axis should not occur based on the configuration of the workpiece, it is possible to ignore measured movements along that axis. However, the flexure of the spring members and resulting movements within the probe may contribute to a measurement error component along the axis of interest, in addition to creating false movement readings on other axes.

Thus, there has arisen a need in industry for a precision measurement probe in which movement along the various axes can be selectively prevented, by locking the stylus so that it will not move along one or more selected axes. However, a compact, effective locking measurement probe has not heretofore been available.

SUMMARY OF THE INVENTION

Therefore, it is a general object of the present invention to provide an improved position determining probe with a locking mechanism for selectively preventing movement in one or more position measurement directions.

A further object of the invention is to provide an improved position determining probe with a pneumatic locking mechanism for selectively preventing movement in one or more position measurement directions.

It is also an object of the invention to provide a novel and improved pneumatic actuator which applies substantial force to a limited area over a relatively short throw distance, and therefore has substantial applications in construction of a locking measurement probe.

An additional object of the invention is to provide a locking element and a corresponding locking element receiving component.

Another object of the invention is to provide a novel and improved air control system for actuating a pneumatic locking mechanism for selectively preventing movement in one or more position measurement directions.

Yet another object of the invention is to provide an improved quick-release stylus mounting mechanism for a measurement probe.

These objects, and others which will be apparent to those skilled in the art based on the drawings, text, and claims, are achieved in a preferred embodiment by constructing a measurement probe which is moved into contact with an object, and generates variable signals indicating the position of the object relative to the probe along a plurality of directions, thereby precisely defining the spatial position of the object. The probe has one or more pneumatically actuated locking mechanisms, each of which can be selectively actuated to prevent movement along respective movement directions. The pneumatic actuator has a flexible diaphragm which is expanded by application of air pressure to move a spring member, thus engaging a locking element connected to the spring member with a receiving element to prevent movement of the probe along the associated direction.

A pneumatic control system is provided to control the locking mechanism(s) in accordance with operator desires, a predetermined program, or operating requirements of an electronically controlled machine associated with the probe.

DETAILED DESCRIPTION OF THE PREFERRED EMBODIMENTS

Figure 1:
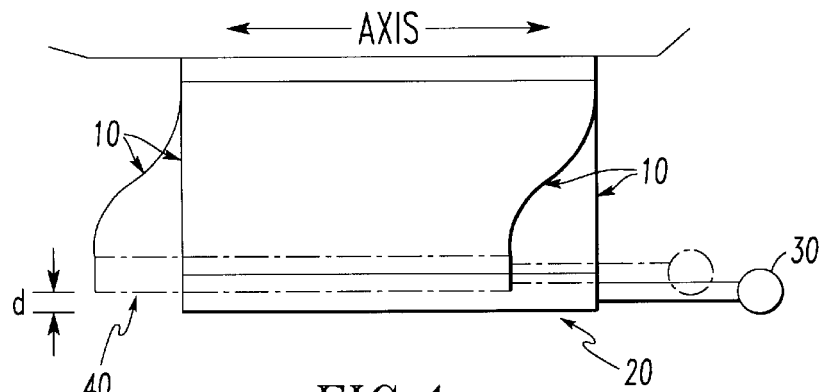
FIG. 1 is a diagram showing geometric error introduced by spring members in conventional measurement probes.

The present invention relates generally to probes which are moved into spatial contact with an object, so as to generate variable signals indicating the position of the object relative to the probe along a plurality of directions, thereby precisely defining the spatial position of the object. The invention particularly relates to a locking mechanism and locking method for preventing movement of such a probe along one or more of its sensing directions. In a preferred embodiment of this invention, a pneumatic actuator is provided for each direction of movement of the probe. These actuators may be selectively operated to move a locking protrusion connected to the actuator into a receiving portion, thus preventing movement of the probe along the associated directions.

In a preferred embodiment, the locking probe has three sensing directions, corresponding to X, Y, and Z axes, and is lockable in any of these three directions. In typical use, the probe might be locked along all but one of its movement directions, while measurements of workpiece position along the final direction are collected. Although the invention will be described in relation to examples using an X-Y-Z- coordinate system, those skilled in the art will recognize that the application of the locking mechanism disclosed herein is not limited to such probes, but could be similarly applied to probes measuring position using any desired coordinate system. For example, a probe using two-dimensional, rectangular (X-Y) coordinates could be constructed with locking mechanisms as disclosed herein. The principles of the invention may also be applied to probes using various known coordinate systems which are not based on orthogonal axes, for example, measuring systems using spherical (R-θ) coordinates. Thus, the term directions of movement will be used broadly herein to describe any permitted movement path, whether that direction follows a linear, arcuate, angular, irregular, variable, or any other movement path. What is important is that there are a plurality of such directions of movement, and that a locking mechanism is available for at least one of the directions of movement, to selectively prevent movement in that direction while a measurement is taken along another direction of movement. In a given probe, the locking mechanisms may be applied to any one direction of movement, any subset of the possible directions of movement, or all of the available directions of movement, depending on the needs of the user.

The locking system of the present invention will be explained first with reference to FIG. 3, which is an isometric view of an operating mechanism 300 for a single axis according to the present invention. Operating mechanism 300 is constructed on a generally rectangular base 302 which is mounted in the probe so as not to move along axis X. A pair of V-springs 308 are held against opposed sides of base 302 by mounting blocks 310. A transformer mount 312 is attached between V-springs 308, in parallel to base 302, to permit movement of transformer mount 312 relative to base 302. Transformer mount 312 carries a conventional precision position measurement device, such as a linear variable differential transformer (LVDT) or an optical displacement transducer. This conventional measurement device is omitted from the drawing, with the objective of more clearly illustrating the locking mechanism according to the present invention. Base 302, transformer mount 312, and mounting blocks 310 are machined from aluminum or a similarly rigid, lightweight material.

Base 302 has machined within it a recess which forms pneumatic chamber 304. A port 306 is drilled in the side of base 302 to communicate with pneumatic chamber 304, providing access for selective pressurization of pneumatic chamber 304. The top of pneumatic chamber 304 is formed by a latex rubber sheet 314, typically 0.030" or greater in thickness. A locking spring 400 is mounted over rubber sheet 314 with a plurality of fasteners (omitted for clarity) about its periphery to make an airtight seal against base 302, thus sealing chamber 304. A locking element 316 is mounted on the extremity of center portion 402 of locking spring 400.

Figure 4:
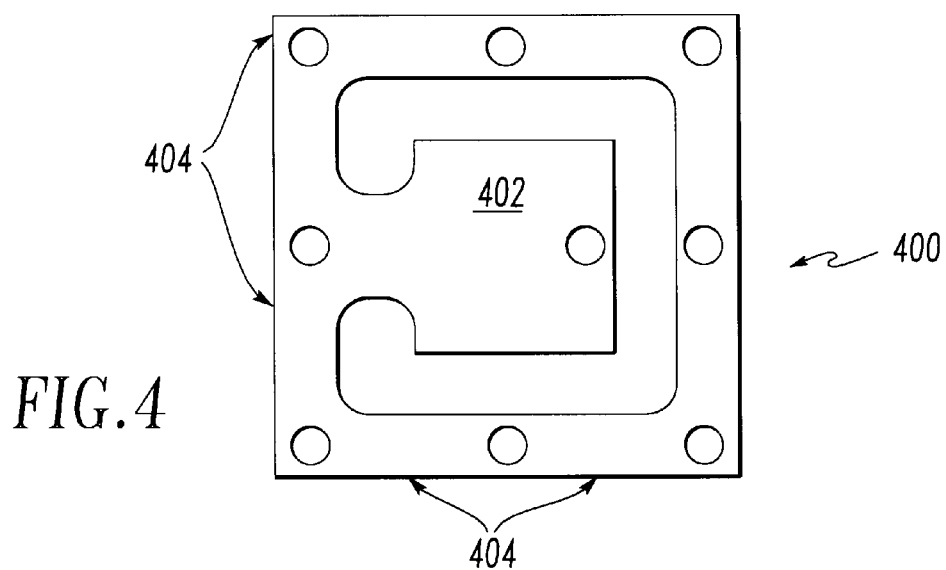
FIG. 4 is a plan view of a locking spring used in the present invention.

FIG. 4 shows a plan view of a preferred embodiment of locking spring 400. Because of the desired compact size and tight manufacturing tolerances of the probe, the pneumatic actuator formed using locking spring 400 preferably has a short throw, such as 0.5 mm. However, it is desirable for the actuator to apply substantial locking force, on the order of 6 lbs. To make this possible, the actuator is designed to force a flexible center portion 402 of locking spring 400 slightly out of the plane of the periphery 404 of locking spring 400. Locking spring 400 is preferably made from a bronze spring sheet with a thickness of approximately 0.016 inches. As shown in the diagram, locking spring 400 is 1.1" square with 0.095" diameter holes in periphery 404. A 0.095" diameter hole is also drilled in the center portion of locking element 316.

Referring again to FIG. 3, locking element 316 may be a pin or other projection. In the preferred embodiment, locking element 316 is a grade 25, 1/8" diameter steel ball bearing. Transformer mount 312 has a recess on its underside, aligned with locking element 316. This recess (shown in FIG. 5a) receives a locking block (also shown in FIG. 5a) which has machined within it a locking element receiving slot 318. Locking element receiving slot 318 is preferably an elongated V-shaped slot with a depth of about 1.2 mm. The direction of elongation of locking element receiving slot 318 is transverse to axis X. Thus, when air pressure is applied to pneumatic chamber 304, rubber sheet 314 is distended, biasing locking spring 400 upwards, causing locking element 316 to firmly engage slot 318. This engagement prevents movement of transformer mount 312 in the direction of the X axis.

Figure 3:
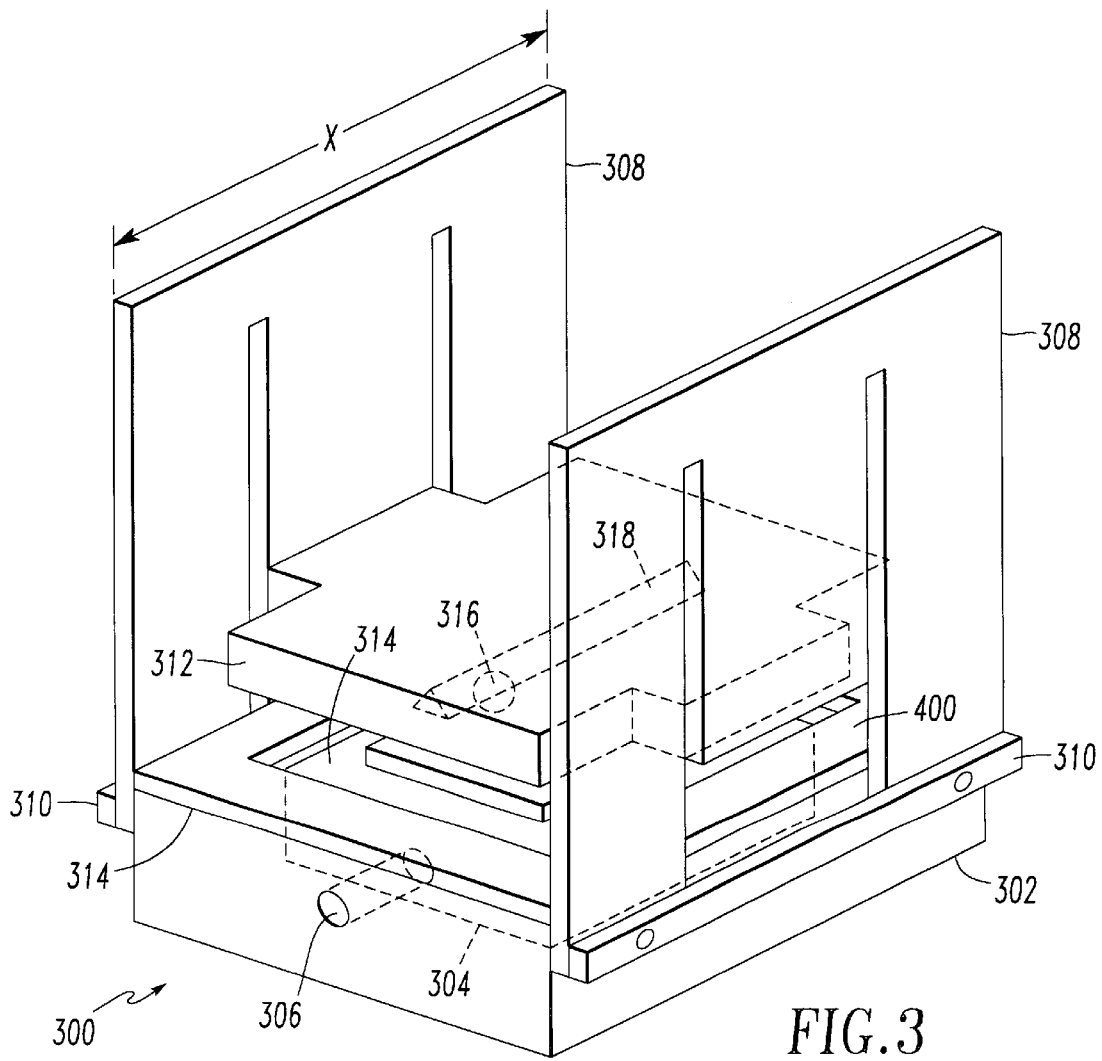
FIG. 3 is an isometric view of a locking mechanism according to the present invention.
Figure 5A:
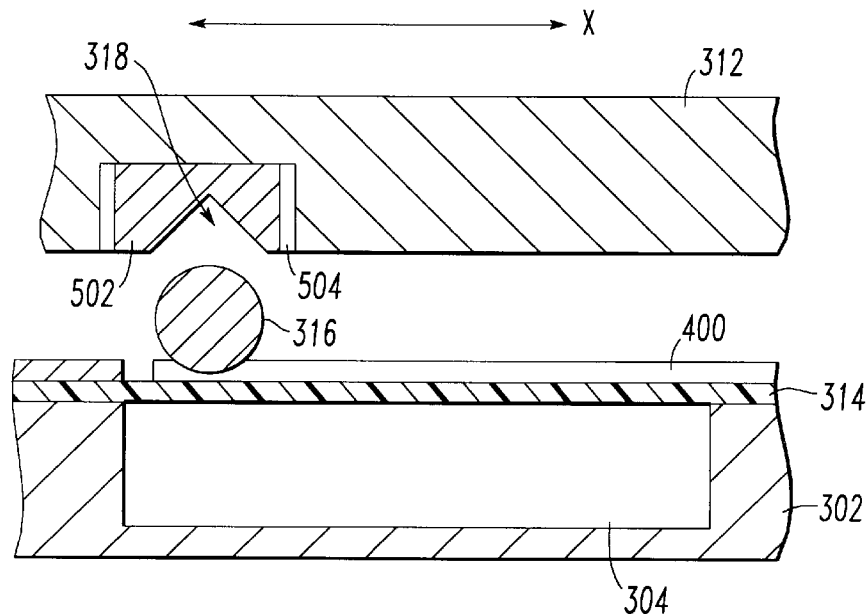
FIGS. 5a and 5b are side sectional views of the locking mechanism of FIG. 3, showing the relationship of the movable locking element with a receiving portion for the locking element in unlocked and locked conditions, respectively.

FIG. 5a is a side sectional view of the locking mechanism of FIG. 3, showing the relationship of locking element 316 with locking element receiving slot 318 when the locking mechanism is not actuated. Locking element receiving slot 318 is machined in a steel locking block 502 which is mounted, preferably with epoxy, in a recess 504 machined in transformer mount 312. When the locking mechanism is not actuated, locking element 316 should not extend into locking element receiving slot 318, but should permit free movement of transformer mount 312 along the X axis.

Figure 5B:
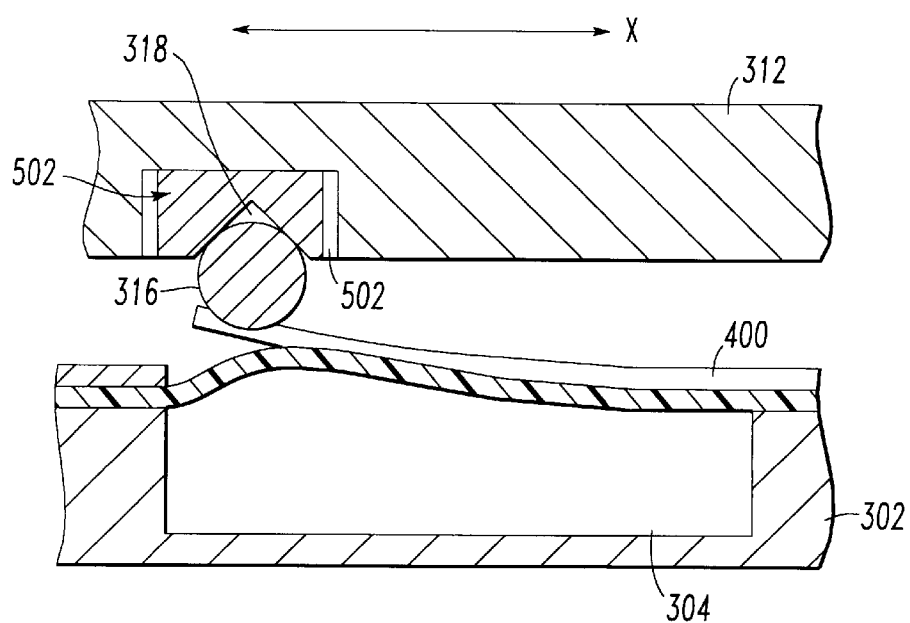

FIG. 5b is a side sectional view of the locking mechanism, showing the relationship of locking element 316 with locking element receiving slot 318 when the locking mechanism is actuated. When the locking mechanism is actuated, locking element 316 extends into locking element receiving slot 318 and contacts it at two points, firmly preventing movement of transformer mount 312 in the direction along the X axis.

The pneumatic mechanism according to the present invention provides significant advantages in the context of a precision measurement probe. It is possible within the scope of the invention to use electric actuation mechanisms such as motors or solenoids. However, through their research, the inventors have determined that operating heat produced by such electrical mechanisms tends to thermally distort sensitive measurement probe components, introducing an additional potential source of measurement error. Pneumatic actuation in the manner described herein, in contrast, generates no appreciable thermal distortion. Thus, pneumatic actuation is preferred in applications where precision is critical. Pneumatic actuation, using for example the design shown in FIG. 3, also provides a significantly greater mechanical locking force for the space used. A much larger solenoid or motor actuator would be needed to provide the same force obtained with the preferred design. For example, with a pneumatic chamber size of 0.64 square inches and an air pressure of 7–10 psi, an upward locking force of approximately 6 lbs is produced.

Other locking mechanisms, such as a pneumatic cylinder arrangement or spring tube, could also be used to provide the necessary locking force in the present invention. However, the pneumatic chamber of the present invention also provides significant advantages over more conventional cylinder arrangements and spring tubes, in that a pneumatic cylinder or spring capable of generating the desired force levels is relatively large compared to the size of the measurement probe, and in particular has an elongated dimension in the direction of throw, requiring considerable space for mounting. The present invention, in contrast, provides locking mechanisms for the X, Y, and Z axes of a probe which can be adapted to fit between the probe's measurement components without significantly increasing the size of the probe housing or the measurement structure.

Figure 6:
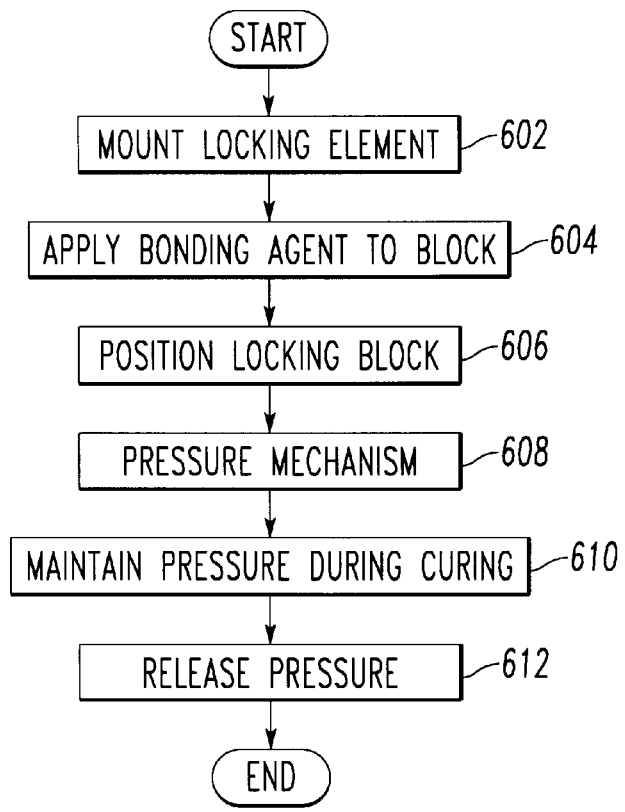
FIG. 6 is a flowchart showing a preferred process for aligning and mounting the locking element and receiving portions.

FIG. 6 is a flowchart showing a preferred process for aligning and mounting the locking element and receiving portion of the inventive mechanism. In this process, as shown in Block 602, the locking element is mounted on the spring element at a predetermined location, for example, by soldering it into a hole provided for that purpose. Then, in Block 604, epoxy or other suitable bonding agent is applied to the locking block (containing the locking element receiving slot). In Block 606, the locking block is positioned in its recess. Next, in Block 608, the pneumatic mechanism is pressurized to firmly force the locking element into contact with the locking element receiving slot. The locking block is allowed to move to find its "natural position," wherein the locking element is accurately aligned in two point contact with the locking element receiving slot. As shown in Block 610, pneumatic pressure is maintained (e.g. for 20 minutes) during curing of the bonding agent, to ensure that the locking block is accurately aligned. Finally, in Block 612, the pressure.

To form a multi-dimensional locking measurement probe according to the present invention, the locking mechanism shown in FIG. 3 and manufactured as described above is replicated for multiple axes. As an example, FIG. 7 is a sectional view of an improved probe (shown schematically) incorporating three air-actuated locking mechanisms corresponding to three axes of movement.

Figure 7:
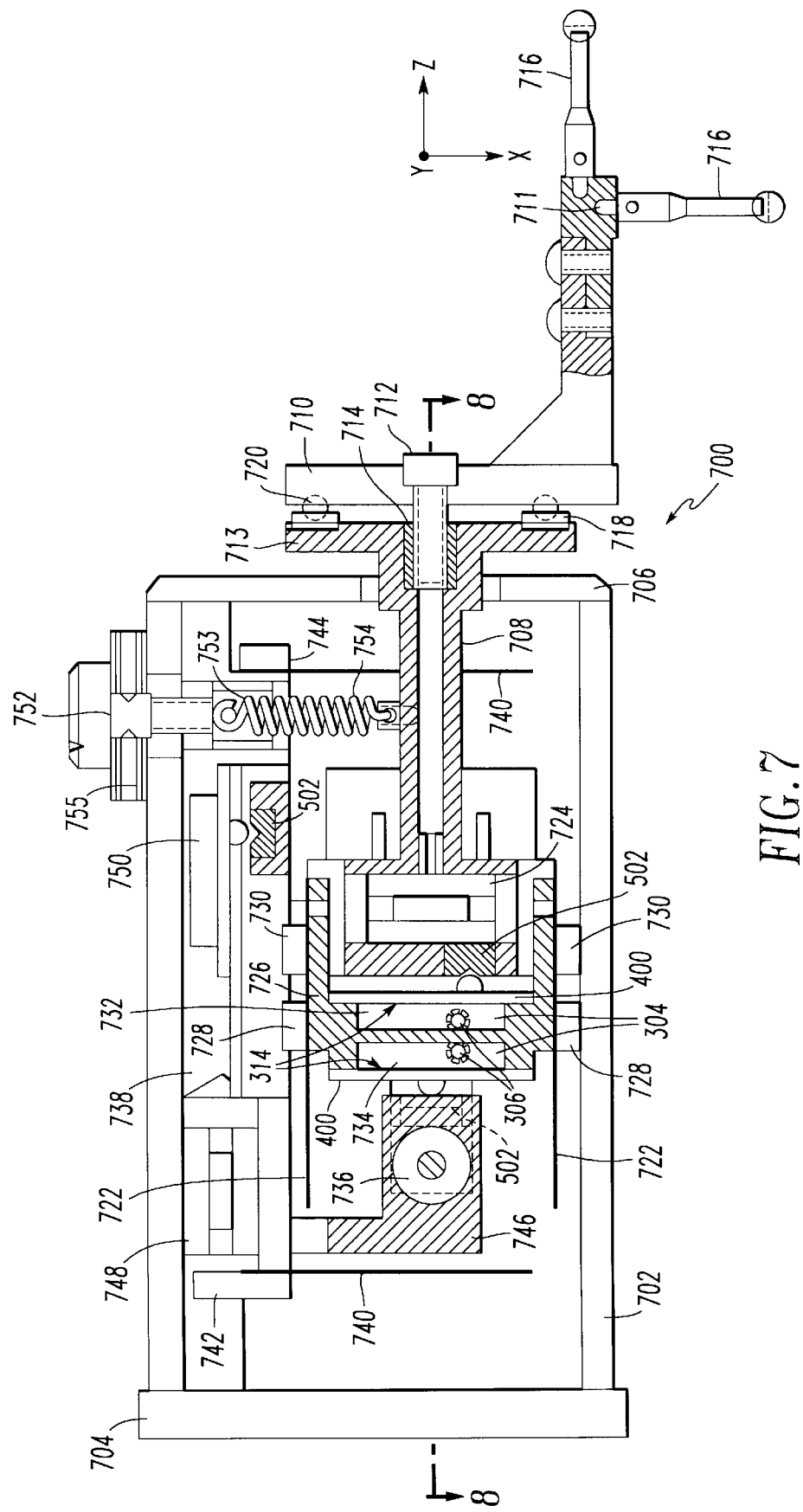
FIG. 7 is a schematic sectional view of a probe incorporating three locking mechanisms according to the present invention, corresponding to three directions of movement of the probe.

As shown in FIG. 7, probe 700 is preferably mounted in a protective housing 702 with a square cross-section, made of aluminum or similarly lightweight, rigid material. Housing 702 is provided at one end with an aluminum mounting plate 704. Mounting plate 704 incorporates conventional provisions for mounting probe 700 on a machine. In addition, mounting plate 704 preferably provides a communication connector (not shown) for carrying signals between sensing devices in the probe and external devices, and a plurality of air tubing adapters (also not shown) for connecting the pneumatic actuators in the probe to an external pneumatic controller.

At the other end of housing 702, a cover 706 surrounds the protruding X-axis fixture 708 while providing free movement of X-axis fixture 708 in the X, Y, and Z directions. A stylus mount 710, with attached stylus holder 711, is mounted via fastening element 712 to a plate 713 of X-axis fixture 708. Fastening element 712 engages insert 714, which is recessed into X-axis fixture 708. One or more stylus elements 716 are provided in stylus holder 711, depending on the configuration of the workpiece and the measurement goals. Fastening element 712 may be a threaded fastener and insert 714 may be a threaded insert. Alternatively, fastening element 712 may be a strong magnet or a magnetized pin, and insert 714 may be a metallic sleeve of steel or another metal or alloy to which the magnet will stick.

Pairs of spaced dowel pins 718 are provided in plate 713 of X-axis fixture 708, at a plurality of locations about its periphery. Ball bearings 720 mounted on stylus mount 710 are positioned to engage a corresponding adjacent pair of dowel pins 718. Dowel pins 718 are spaced in conformity with the diameter of ball bearings 720 so that ball bearings 720 engage both of the pair of dowel pins 718, each at a single point. Dowel pins 718 and ball bearings 720 are made of steel. Ball bearings 720 may be, for example, grade 25, 1/8" diameter ball bearings.

Figure 10:
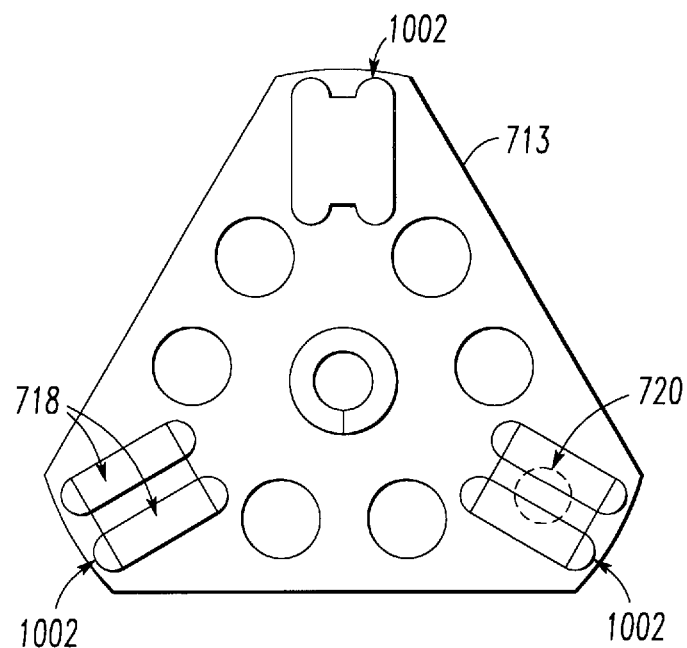
FIG. 10 is a top view of a stylus receiving portion of the probe, showing an improved ball-and-pin interface according to the invention.

FIG. 10 is an end view of plate 713 of X-axis fixture 708 showing the dowel pin and ball bearing interface structure in more detail. Referring now to FIG. 10, plate 713 of X-axis fixture 708 is provided with three recessed areas 1002 positioned at 120 degree intervals on the periphery of plate 713. Each recessed area 1002 is shaped to receive and hold, in parallel separated positions, two steel dowel pins 718. Dowel pins 718 may be 3/32" in diameter and 0.25 inches in length. The size and separation distance of dowel pins 718 are chosen in conjunction with the size of ball bearing 720, so that ball bearing 720 will rest between and against both pins 718.

Figure 2A:
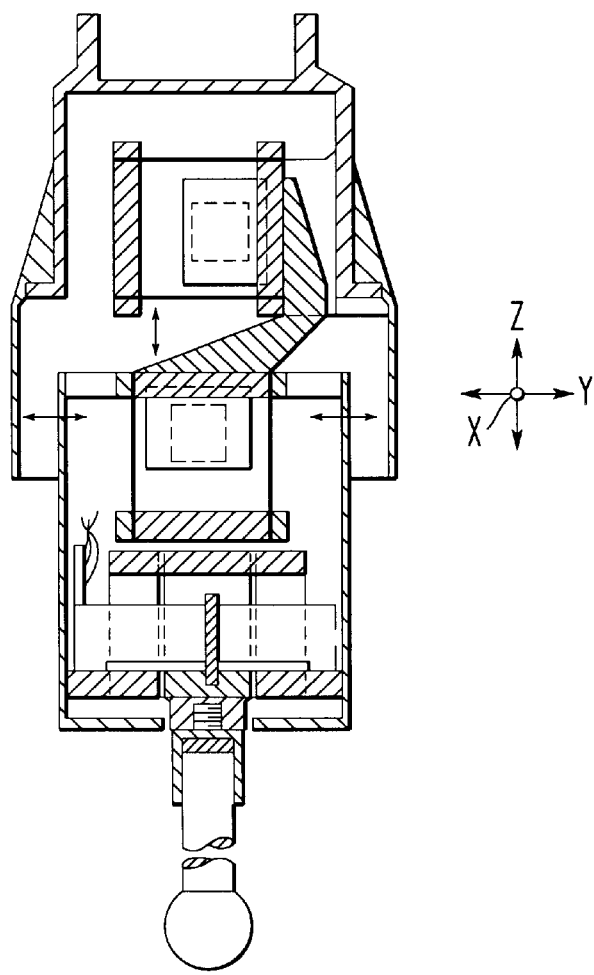
FIG. 2a is a view of a conventional measurement probe.
Figure 2B:
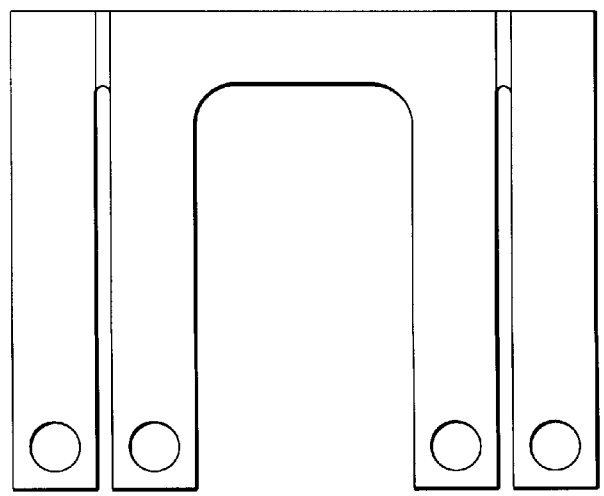
FIG. 2b is a diagram of a spring member used in another known probe marketed by API.

The structure of the probe mechanism will now be described in detail with reference again to FIG. 7. As shown in FIG. 7, X-axis fixture 708 is mounted to move along the X axis on X-axis V-springs 722, which are of the type shown in FIG. 2b. As fixture 708 moves along the X-axis, it actuates a linear variable differential transformer, X-axis LVDT 724, which produces a position signal that is transmitted through wires (omitted for clarity) extending out through mounting plate 704. V-springs 722 are mounted to Y-axis fixture 726 by threaded fasteners (not shown) extending through strip washers 728. X-axis V-springs 722 are mounted to X-axis fixture 708 by threaded fasteners (not shown) extending through square washers 730. An X-axis locking mechanism 732 includes a pneumatic chamber 304 formed in Y-axis fixture 726, as well as a locking spring 400, rubber sheet 314, locking element 316, locking block 502, and the other components shown generally in FIGS. 3 and 5a. A Y-axis locking mechanism 734 is mounted adjacent to X-axis locking mechanism 732 in Y-axis fixture 726, but actuates in the opposite direction from the actuation direction of the X-axis locking mechanism.

Two Z-axis V-springs 740 are mounted to Z-axis fixture 746 by strip washer 742, which also functions as a core holder for Z-axis LVDT 748, and square washer 744, respectively. Z-axis V-springs 740 are mounted to main support 738, which is mounted to housing 702. A Z-axis locking mechanism 750 is provided in main support 738, in the same manner as the other locking mechanisms. An adjacent locking block 502 is mounted in Z-axis fixture 746 to facilitate locking the Z-axis.

An adjusting screw 752 mounted through disk 755 has threads that engage adjustable block 753 to vary tension in spring 754. One end of spring 754 is connected to adjustable block 753, and the other end of spring 754 is connected to X-axis fixture 708. Adjusting screw 752 provides a means for variably countering the weight of stylus holder 711 and stylus 16 to maintain a centered equilibrium position of X-axis fixture 708.

As another novel and useful feature of the probe disclosed herein, a servo motor may be provided in place of the manual mechanism shown, to adjust the rest position of the probe to eliminate the LVDT offset resulting from the weight of the probe and stylus.

Ports 306 for each of the three locking mechanisms (X, Y, and Z axes) are connected to connectors (not shown) in mounting plate 704 by Teflon (TM) air tubing (not shown), which may be of 0.034 " inside diameter and 0.058 " outside diameter. Thus, an interface is provided for an external pneumatic control system for selectively operating the locking mechanisms.

Figure 8:
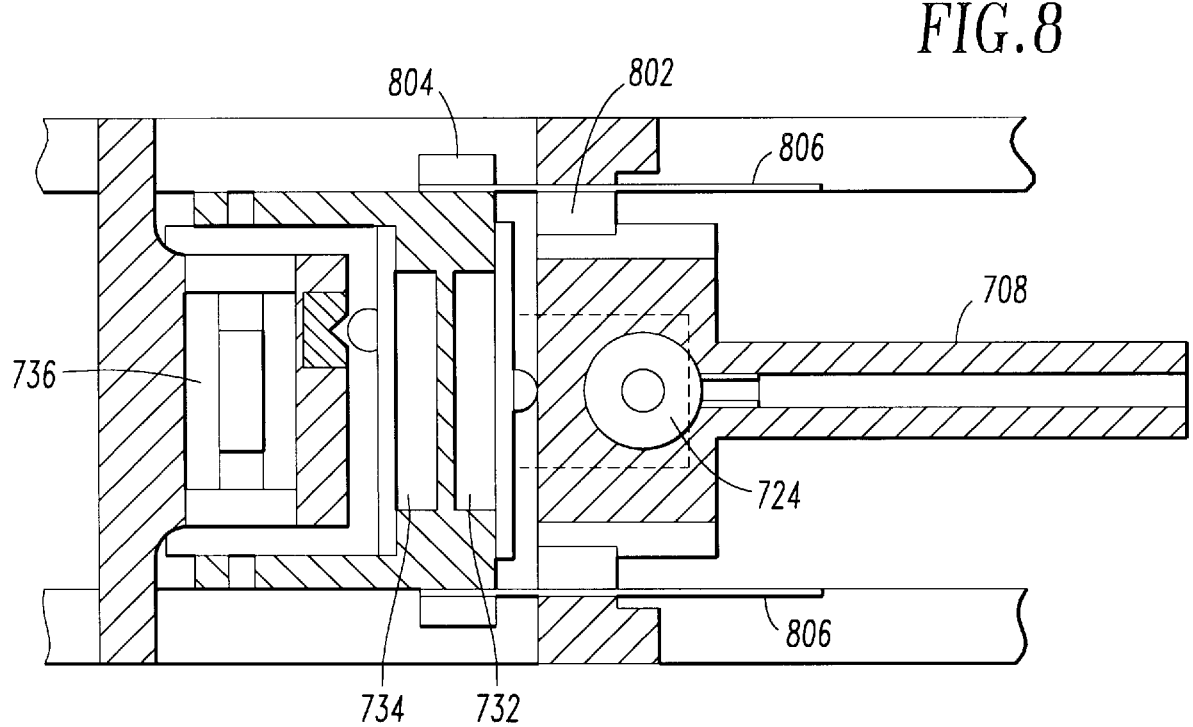
FIG. 8 is a further side sectional view of the probe shown in FIG. 7.

FIG. 8 is a side sectional view of the probe shown in FIG. 7, which provides a better view of the Y-axis spring mounting. FIG. 8 shows thread washer 802 and strip washer 804 (with threaded fasteners, not shown) used for mounting Y-axis V-springs 806 to the X-axis fixture 708 and Y-axis fixture 726. Y-axis LVDT 736 measures movement along the Y axis.

Figure 9:
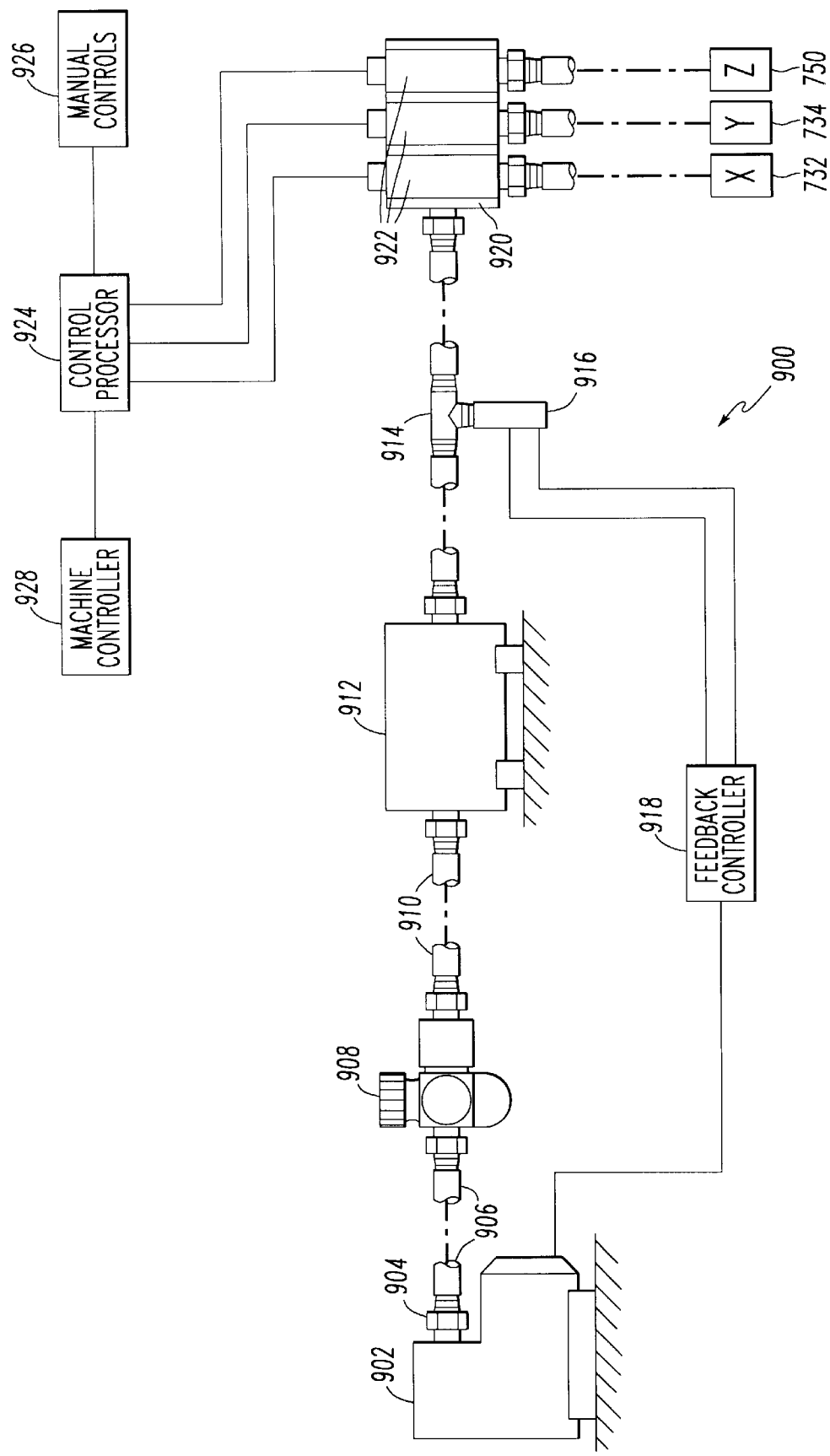
FIG. 9 is a schematic diagram of an air control system according to the present invention for controlling the locking mechanisms shown in FIGS. 3–5.

The application of air pressure to each pressure chamber to actuate its corresponding axial locking mechanism is controlled by an air pressure control system. FIG. 9 is a schematic diagram of a preferred embodiment of a pneumatic control system 900 according to the present invention.

Pneumatic control system 900 comprises a pump 902, connected via fitting 904 and tubing 906 to filter/regulator 908, which may incorporate a pressure gauge. The output of filter/regulator 908 is connected via tubing 910 to reservoir 912. Reservoir 912 is connected via fitting 914 to pressure sensor or switch 916, which is electrically connected to a feedback controller 918, which is in turn connected to control pump 902. In operation, feedback controller 918 operates the pump as needed to maintain pressure in reservoir 912 within a predetermined range.

Fitting 914 is also connected to manifold 920, which communicates with a plurality of electrically switched valves 922. The number of valves 922 provided is equal to the number of pneumatic locking mechanisms to be controlled. Valves 922 are electrically connected to control processor 924, which has associated with it manual controls 926 and may be connected to a machine controller 928. In operation, control processor selectively actuates each of valves 922 depending on (1) manual control input by the operator through manual controls 926; (2) a predetermined internal program for conducting an automated measurement and/or positioning sequence; and/or (3) control signals from machine controller 928. Machine controller 928 may be a controller for a position measuring or other electronically controlled machine, and machine controller 928 may provide signals to cause locking of predetermined directions of movement of the probe as part of an automated measuring and/or positioning process.

Valves 922 are operably connected to individually control pressurization of the pneumatic chambers 304 of X-axis locking mechanism 732, Y-axis locking mechanism 734, and Z-axis locking mechanism 750, respectively.

Thus, there has been disclosed an improved measurement probe incorporating numerous improvements. Those skilled in the art will appreciate that the invention is not limited to the specific examples herein, but may be varied in a variety of manners which will be apparent upon review of the specification and drawings.

I claim:

1. A position sensing probe for use in position determining apparatus, comprising:

a fixed part for mounting in the position determining apparatus, whereby the apparatus can move the probe relative to a workpiece surface;

a movable part, having means for sensing the workpiece surface;

support means for supporting the movable part on the fixed part so as to permit deflection of the movable part relative to the fixed part along a plurality of directions;

a plurality of measuring means associated respectively with said directions, for measuring the amount of said deflection of the movable part relative to the fixed part, and providing an output in accordance therewith; and pneumatically actuated locking means located between said movable part and said fixed part for selectively preventing relative motion therebetween in at least one of said directions while permitting relative motion therebetween in another of said directions.

2. The probe of claim 1, wherein the fixed part comprises a rigid base.

3. The probe of claim 2, wherein the rigid base is comprised of aluminum.

4. The probe of claim 2, wherein the rigid base comprises a recess that defines a pneumatic chamber.

5. The probe of claim 4, wherein the rigid base includes a port for communicating with the pneumatic chamber.

6. The probe of claim 1, wherein the movable part comprises a transformer mount.

7. The probe of claim 6, wherein the transformer mount is disposed substantially parallel to the fixed part.

8. The probe of claim 6, wherein the transformer mount comprises a recess on a side thereof facing the fixed part.

9. The probe of claim 1, wherein the support means comprises at least one V-spring.

10. The probe of claim 1, wherein the support means comprises a pair of V-springs disposed on opposite sides of the movable part.

11. The probe of claim 1, wherein the support means is at one portion thereof joined rigidly to the fixed part and at another portion thereof permits resilient movement of the movable part.

12. The probe of claim 1, wherein the measuring means comprises a linear variable differential transformer.

13. The probe of claim 4, wherein the pneumatic actuated locking means comprises a resilient layer sandwiched between the rigid base and a locking spring, wherein the resilient layer air-tightly seals the pneumatic chamber.

14. The probe of claim 13, further comprising a locking element joined to a surface of the locking spring opposite to a surface thereof abutting the resilient layer.

15. The probe of claim 14, further comprising a locking block having a receiving slot disposed in the movable part.

16. The probe of claim 15, wherein, when pressurized air fills the pneumatic chamber, the resilient layer is deformed thereby deflecting the locking spring such that the locking element is forced to engage the receiving slot, whereby relative movement between the fixed part and the movable part is prevented in at least one direction.

17. The probe of claim 13, further comprising an air supply means for selectively actuating the pneumatically actuated locking means, the air supply means comprising an air pump, air supply conduits, electrically switchable valves for selectively supplying air to the pneumatic actuated locking means and control means for controlling the electrically switchable valves.

18. The probe of claim 13, wherein the rigid base associated with the pneumatically actuated locking means associated with locking relative motion in at least one direction comprise an integral unit.

19. The probe of claim 1, further comprising stylus elements connected via a stylus mount to the movable part.

20. The probe of claim 19, further comprising balance means for compensating for the weight of at least one of the stylus elements and stylus mount.

21. A method of controlling the position of a sensing probe having a fixed part and a movable part, the movable part being supported by support means to permit deflection of the movable part relative to the fixed part along a plurality of directions when sensing a surface of a workpiece, the method comprising the steps of:

measuring the amount of said deflection of the movable part and providing an output in accordance therewith; and pneumatically actuating a locking means to lock the movable part and the fixed part to prevent relative motion therebetween in at least one of said directions while permitting relative motion therebetween in another of said directions.

22. The method of claim 21, further comprising controlling the locking means via a computer program.

23. The method of claim 21, further comprising selectively locking the locking means by filling with compressed air a recess in the fixed part and distorting a resilient layer.

24. The method of claim 21, further comprising locking the locking means by forcing a member attached to the fixed part into a receiving slot of a locking block disposed in the movable part.

25. The method of claim 21, wherein the step of measuring is performed by a plurality of measuring means associated respectively with the plurality of directions.

* * * * *